(12) United States Patent
Gallo et al.

(10) Patent No.: US 6,511,169 B1
(45) Date of Patent: Jan. 28, 2003

(54) INK JET PRINTING METHOD

(75) Inventors: Elizabeth A. Gallo, Penfield, NY (US); James Blease, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/919,978

(22) Filed: Aug. 1, 2001

(51) Int. Cl.$^7$ .................................................. B41J 2/01
(52) U.S. Cl. ......................................... 347/100; 347/96
(58) Field of Search ................................ 347/100, 101, 347/96; 106/31.46, 31.47, 31.48

(56) References Cited

U.S. PATENT DOCUMENTS

| | | | | |
|---|---|---|---|---|
| 4,975,094 A | * | 12/1990 | Miki et al. ....................... | 8/537 |
| 5,747,146 A | * | 5/1998 | Kashiwazaki et al. ....... | 347/100 |
| 5,897,694 A | * | 4/1999 | Woolf ......................... | 428/195 |
| 6,120,589 A | * | 9/2000 | Bannai et al. ............ | 106/31.43 |
| 6,152,969 A | * | 11/2000 | Matsumoto et al. ...... | 106/22 H |
| 6,322,619 B1 | * | 11/2001 | Lesani et al. ............. | 106/31.43 |

FOREIGN PATENT DOCUMENTS

| | | | |
|---|---|---|---|
| EP | 1 063 268 A1 | 12/2000 | |
| EP | 1 067 155 A1 | 1/2001 | |
| JP | 02016171 | * 1/1990 | ............ C09D/11/00 |
| JP | 08310115 | * 11/1996 | ............ B41M/5/00 |
| JP | 00256587 A | 9/2000 | |
| JP | 01072884 A | 3/2001 | |
| WO | 00/234400 A1 | 4/2000 | |
| WO | 01/18123 A1 | 3/2001 | |

* cited by examiner

*Primary Examiner*—John Barlow
*Assistant Examiner*—Manish S. Shah
(74) *Attorney, Agent, or Firm*—Harold E. Cole

(57) ABSTRACT

An ink jet printing method, having the steps of: A) providing an ink jet printer that is responsive to digital data signals; B) loading the printer with an ink-receiving element having a support having thereon an ink-receiving layer, C) loading the printer with an ink jet ink set for color printing having: (a) a yellow ink having a carrier and a yellow dye; (b) a magenta ink having a carrier and a mixture of a water-soluble, magenta anthrapyridone dye and Reactive Red 23, Reactive Red 24, Reactive Red 31, Reactive Red 120, Reactive Red 180, Reactive Red 241, Acid Red 35, Acid Red 52, Acid Red 249, Acid Red 289, Acid Red 388, Direct Red 227 or CAS No. 153204-88-7; and (c) a cyan ink having a carrier and a cyan dye. and D) printing on the ink-receiving layer using the ink jet ink in response to the digital data signals.

19 Claims, No Drawings

INK JET PRINTING METHOD

CROSS REFERENCE TO RELATED APPLICATIONS

Reference is made to commonly assigned, co-pending U.S. patent applications: Ser. No. 09/919,739 by Blease et al., filed Aug. 01, 2001 entitled "Ink Jet Ink Set"; Ser. No. 09/920,188 by Blease et al., filed Aug. 01, 2001 entitled "Dye Mixture For Ink Jet Ink"; Ser. No. 09/920,400 by Gallo et al., filed Aug. 01, 2001 entitled "Ink Jet Printing Method"; Ser. No. 09/920,167 by Blease et al., filed Aug. 01, 2001 entitled "Ink Jet Ink Set"; and Ser. No. 09/920,105 by Evans et al., filed Aug. 01, 2001 entitled "Ink Jet Printing Method".

FIELD OF THE INVENTION

This invention relates to an inkjet printing method using an ink jet ink set for ink jet printing that uses an anthrapyridone dye mixture as a colorant in a magenta ink.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Inkjet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

The choice of a colorant in inkjet systems is critical to image quality. For colors such as cyan, magenta, yellow, green, orange, etc., the peak wavelength (λ-max), the width of the absorption curve and the absence of secondary absorptions are important. The colorant should also have a high degree of light fastness after printing onto the ink-receiving element. For aqueous dye-based inks, the dye needs to be sufficiently soluble in water to prepare a solution that is capable of producing adequate density on the receiving element and stable for extended periods of storage without precipitation. High quality photorealistic ink jet printing with dye-based inks requires dyes which will provide both bright hue and good light stability. It is difficult to find dyes, particularly magenta dyes, which meet all of these requirements.

Aqueous dye-based inks for high quality photorealistic ink jet printing require water-soluble dyes with excellent color and high light and water fastness. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy.

It is well known in the art of color measurement that hue and brightness are among the basic perceptual attributes of color. (For a complete description of color measurement refer to "Measuring Color", 2nd Edition by R. W. G. Hunt, published by Ellis Horwood Ltd., 1991.) Hue is defined as the attribute of a visual sensation according to which an area appears to be similar to one, or to proportions of two, of the perceived colors red, yellow, green and blue.

In terms of the CIELAB color space, hue is mathematically defined by hue angle, h°, according to $$h° = \tan^{-1}(b^*/a^*)$$ Equation 1 where a* is a measure of how green or red the color is and b* is a measure of how blue or yellow a color is. Brightness is defined as the attribute of a visual sensation according to which an area appears to exhibit more or less light. In terms of the CIELAB color space, brightness is mathematically defined by chroma, C*, according to $$C^* = (a^{*2} + b^{*2})^{1/2}$$ Equation 2

For the production of high quality photorealistic images via ink jet printing, ink sets must be able to provide printed images having good color characteristics. In particular, it is desirable to have hue angles of about 270 for the blue record and about 339 for the magenta record. It is also desirable to maximize chroma (also referred to as vividness), particularly for the red record.

U.S. Pat. No. 6,152,969; EP 1,063,268; EP 1,067,155; WO 00/23440; WO 01/18123; JP 2000-256587 and JP 2001-072884 describe magenta anthrapyridone dyes for ink jet printing. However, there is a problem with these dyes in that when they are printed with typical yellow dyes, the chroma values of the resulting red records are too low.

It is an object of this invention to provide an inkjet printing method using an ink jet ink set having magenta inks that give good hue when printed. It is another object of this invention to provide an ink jet printing method using an ink jet ink set using magenta inks that, when printed with typical yellow inks, give high chroma values for the resulting red records. It is another object of this invention to provide an ink jet printing method using an ink jet ink set having magenta inks with good fastness to light when printed.

SUMMARY OF THE INVENTION

These and other objects are achieved in accordance with the present invention comprising an ink jet printing method, comprising the steps of A) providing an ink jet printer that is responsive to digital data signals;

B) loading the printer with an ink-receiving element comprising a support having thereon an ink-receiving layer;

C) loading the printer with an ink jet ink set for color printing comprising:
  (a) a yellow ink comprising a carrier and a yellow dye;
  (b) a magenta ink comprising a carrier and a mixture of a water-soluble, magenta anthrapyridone dye and Reactive Red 23, Reactive Red 24, Reactive Red 31, Reactive Red 120, Reactive Red 180, Reactive Red 241, Acid Red 35, Acid Red 52, Acid Red 249, Acid Red 289, Acid Red 388, Direct Red 227 or CAS No. 153204-88-7; and (c) a cyan ink comprising a carrier and a cyan dye; and D) printing on the ink-receiving layer using the ink jet ink in response to the digital data signals.

DETAILED DESCRIPTION OF THE INVENTION

Dyes referred to by dye numbers are numbers assigned by The Color Index.

Any magenta anthrapyridone dye may be used in the invention, as disclosed, for example, in U.S. Pat. No. 6,152,969; EP 1,063,268; EP 1,067,155; WO 00/23440; WO 01/18123; JP 2000-256587 and JP 2001-072884, the disclosures of which are hereby incorporated by reference. Methods of preparation of these dyes are disclosed in these references. In a preferred embodiment, the magenta anthrapyridone dye is a sulfonic acid or sulfonate derivative of a compound represented by the general formula:

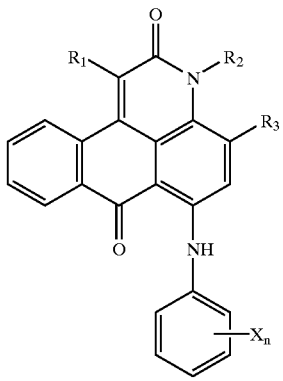

wherein:
$R_1$ represents hydrogen, or a substituted or unsubstituted alkoxycarbonyl, carboxyl, benzoyl, alkyl, aryl, hetaryl, alkoxy or phenoxy group;

$R_2$ represents hydrogen or a substituted or unsubstituted alky, alicyclic, aryl or hetaryl group;

$R_3$ represents hydrogen, carboxyl, or a substituted or unsubstituted alkyl, alicyclic, aryl, hetaryl, alkoxy or phenoxy group;

each X independently represents hydrogen, halogen, nitro, hydroxyl, carboxyl, or a substituted or unsubstituted alkyl, alicyclic, aryl, hetaryl, alkoxy, phenoxy, amino, amido or sulfonamido group; and n represents 0, 1, 2 or 3.

In a preferred embodiment of the invention, $R_1$ in the above formula is benzoyl. In another preferred embodiment, $R_2$ is hydrogen. In yet another preferred embodiment, $R_3$ is a sulfonated phenoxy group. In yet still another preferred embodiment, n is 1 and X is a sulfonate group.

A preferred magenta anthrapyridone dye which can be used in the invention is sold commercially as JPD Magenta EK-1 Liquid, from Nippon Kayaku Kabushiki Kaisha as an approximately 10% solution in water.

Any cyan dye may be used in the ink jet ink set employed in the invention described above. In a preferred embodiment, the cyan dye is a copper phthalocyanine dye. In another preferred embodiment, the cyan dye is Direct Blue 199, Direct Blue 307, Direct Blue 86, Acid Blue 9 or mixtures thereof.

Any yellow dye may be used in the ink jet ink set employed in the invention described above. In a preferred embodiment, the yellow dye is a yellow azoaniline dye. In another preferred embodiment, the yellow dye is Direct Yellow 132, Direct Yellow 107, Direct Yellow 86, Direct Yellow 173, Acid Yellow 23 and Acid Yellow 17 or mixtures thereof.

A black ink containing a black colorant can be used in the ink jet ink set employed in the invention described above to further increase the available color gamut. Black colorants which can be used include Reactive Black 31, Direct Black 19, Direct Black 154, Direct Black 168, Food Black 2, Fast Black 2, Solubilized Sulfur Black 1 (Duasyn® Black SU-SF) or a black pigment.

The following commercially available magenta dyes can be used for the dye mixture employed in this invention:

A. Magenta dye, CAS No. 224628-70-0, sold as JPD Magenta EK-1 Liquid from Nippon Kayaku KK as a 10% solution in water B. Reactive Red 23, sold as Duasyn® Red 3B-SF from Clariant Corp. as a solid C. Reactive Red 24, sold as Basacid® Red 495 Liquid from BASF Corp.

D. Reactive Red 31, sold as Reactive Red 31 Na Solution from Sensient Colors, LLC as a 10% solution in water E. Reactive Red 120, sold as Basacid® Red NB 510 Liquid from BASF Corp.

F. Reactive Red 180, sold as Duasyn® F3B-SF Liquid from Clariant Corp. as a 10% solution in water G. Reactive Red 241, sold as Intrajet® Magenta VER from Crompton & Knowles Colors, Inc.

H. Acid Red 35, sold as Acid Fast Red 3B No. 855D from City Chemical, LLC as a solid I. Acid Red 52, sold as Acid Red 52 Na Solution from Sensient Colors, LLC as a 10% solution in water J. Acid Red 249, sold as Acid Red 249 Na Solution from Sensient Colors, LLC as a 10% solution in water K. Acid Red 289, sold as Acid Red 289 from Wamer-Jenkinson Co. as a 10% solution in water L. Acid Red 388, sold as Acid Red 388 Na Solution from Sensient Colors, LLC as a 10% solution in water M. Direct Red 227, sold as Aizen® Direct Red 227 from Hodogaya Chemical Co. as a solid N. Magenta dye, CAS No. 153204-88-7, sold as Intrajet® Magenta KRP from Crompton and Knowles Colors, Inc. as a 10% solution in water The following commercially available cyan dyes can be used in combination with the dye mixture employed in this invention:

O. Direct Blue 199, sold as Direct Blue 199 Na Solution from Sensient Colors LLC P. Direct Blue 307, sold as ProJet® Cyan 2 Liquid from Avecia Corp. as a 6% solution in water The following commercially available yellow dyes can be used in combination with the dye mixture employed in this invention:

Q. Direct Yellow 132, available as ProJet® Yellow IG from Avecia Corp. as a 7.5% solution in water R. Direct Yellow 107, available as Intrajet® Yellow DG from Crompton and Knowles Colors, Inc. as a 10% solution in water S. Direct Yellow 86, available as Direct Yellow 86 Na Solution from Sensient Technical Colors, LLC as a 10% solution in water T. Direct Yellow 173, available as ProJet® Fast Yellow 2 from Avecia Corp.

U. Acid Yellow 23, available from Sensient Technical Colors, LLC as a 10% solution in water V. Acid Yellow 17, available from Sensient Technical Colors, LLC as a 10% solution in water The following commercially available black colorants can be used in combination with the dye mixture employed in this invention:

W. Reactive Black 31, available as Duasyn® Black KRL-SF from Clariant Corp. as a 10% solution in water X. Direct Black 168, available as Duasyn® Black HEF-SF from Clariant Corp. as a 10% solution in water Y. Solubilized Sulfur Black 1, available as Duasyn® Black SU-SF from Clariant Corp. as a 10% solution in water Z. Direct Black 19, available as Keyamine® Black G Pure Liquid from Keystone Corp. as a 10% solution in water In general, the above dyes comprise from about 0.2 to about 10%, preferably from about 1 to about 5% by weight of each ink jet ink composition. For the magenta ink composition, the dye mixture comprises from about 70 to about 99%, preferably from about 80 to about 90%, by weight of the water-soluble, magenta anthrapyridone dye.

In yet still another preferred embodiment of the invention, additional inks of a "light" cyan ink or "light" magenta ink, which is the same cyan and magenta dyes in (c) and (b) above, except that they are employed at a concentration of about 5% to about 50% of the amount of the cyan and magenta dyes.

A humectant is usually employed in the ink jet composition employed in the invention to help prevent the ink from drying out or crusting in the orifices of the printhead. Examples of humectants which can be used include polyhydric alcohols, such as ethylene glycol, diethylene glycol (DEG), triethylene glycol, propylene glycol, tetraethylene glycol, polyethylene glycol, glycerol, 2-methyl-2,4-pentanediol, 2-ethyl-2-hydroxymethyl- 1,3-propanediol (EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether (DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

Preferred humectants for the inkjet ink composition employed in the invention include DEG, glycerol, DEGMBE, TEGMBE, 1,2-hexanediol, 1,5-pentanediol, urea, 2-pyrrolidinone, EHMP and mixtures thereof. The humectant may be employed in each ink in an amount of from about 5 to about 60 weight percent.

Water-miscible organic solvents may also be added to the ink jet ink composition employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

The amount of aqueous carrier employed in the invention is in the range of approximately 70 to 98 weight %, preferably approximately 90 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the aqueous carrier.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.05–20%), water (20–95%), a humectant (5–70%), water miscible co-solvents (2–20%), surfactant (0.1–10%), biocide (0.05–5%) and pH control agents (0.1–10%).

Additional additives which may optionally be present in the inkjet ink compositions employed in the invention include thickeners, conductivity enhancing agents, anti-kogation agents, drying agents, anti-corrosion agents, and defoamers.

The ink jet ink set employed in this invention may be used in ink jet printing wherein liquid ink drops are applied in a controlled fashion to an ink receptive layer substrate, by ejecting ink droplets from a plurality of nozzles or orifices of the print head of an inkjet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Inkjet printing methods, and related printers, are commercially available and need not be described in detail.

The inkjet ink set employed in the present invention can be used in any of the popular ink jet printing systems, including thermal or piezoelectric drop-on-demand printers and continuous inkjet printers. Of course, the specific ink formulations will vary depending upon the type of ink jet printing system.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference. In a preferred embodiment of the invention, the ink-receiving layer comprises alumina, as disclosed in copending application Ser. No. 09770,814 of Bermel et al., the disclosure of which is hereby incorporated by reference. In another preferred embodiment, the ink-receiving layer has a surface pH of less than about 7.

The following example illustrates the utility of the present invention.

EXAMPLES

Example 1

Magenta Inks

Ink 1 of the Invention

Ink 1 of the invention was prepared using Dye A described above at 3.6 weight % of the ink composition, Dye B at 0.84 weight % of the ink composition, glycerol at 11.5 wt. %, diethylene glycol at 11.5 wt. %, triethylene glycol monobutyl ether at 7.5 wt. %, triethanolamine at 0.9 wt. % and the balance water.

Ink 2 of the Invention

This ink was prepared the same as Ink 1 except that instead of Dye B, Dye C was employed at 0.88 wt. % of the ink. The amount of Dye C was varied in order to maintain a ratio of 3 to 1 for the absorbance of Dye A relative to the absorbance of Dye C.

Ink 3 of the Invention

Ink 3 was prepared the same as Ink 1 except that Dye D was used instead of Dye B at 0.64 wt. %.

Ink 4 of the Invention

Ink 4 was prepared the same as Ink 1 except that Dye E was used instead of Dye B at 0.53 wt. %.

Ink 5 of the Invention

Ink 5 was prepared the same as Ink 1 except that Dye F was used instead of Dye B at 0.75 wt. %.

Ink 6 of the Invention

Ink 6 was prepared the same as Ink 1 except that Dye G was used instead of Dye B at 0.58 wt. %.

Ink 7 of the Invention

Ink 7 was prepared the same as Ink 1 except that Dye H was used instead of Dye B at 0.88 wt. %.

Ink 8 of the Invention

Ink 8 was prepared the same as Ink 1 except that Dye I was used instead of Dye B at 0.16 wt. %.

Ink 9 of the Invention

Ink 9 was prepared the same as Ink 1 except that Dye J was used instead of Dye B at 0.75 wt. %.

Ink 10 of the Invention

Ink 10 was prepared the sarne as Ink 1 except that Dye K was used instead of Dye B at 0.88 wt. %.

Ink 11 of the Invention

Ink 11 was prepared the same as Ink 1 except that Dye L was used instead of Dye B at 0.18 wt. %.

Ink 12 of the Invention

Ink 12 was prepared the same as Ink 1 except that Dye M was used instead of Dye B at 0.76 wt. %.

Ink 13 of the Invention

Ink 13 was prepared the same as Ink 1 except that Dye N was used instead of Dye B at 0.55 wt. %.

Comparative Ink C-1

Ink C-1 was prepared the same as Ink 1 except that Dye A was used at 4.8 wt. % and no Dye B was used.

Comparative Ink C-2

Ink C-2 was prepared the same as Ink C-1 except that no Dye A was used and Dye B was used at 3.34 wt. %.

Comparative Ink C-3

Ink C-3 was prepared the same as Ink C-1 except that no Dye A was used and Dye C was used at 3.5 wt. %.

Comparative Ink C-4

Ink C-4 was prepared the same as Ink C-1 except that no Dye A was used and Dye D was used at 2.57 wt. %.

Comparative Ink C-5

Ink C-5 was prepared the same as Ink C-1 except that no Dye A was used and Dye H was used at 3.5 wt. %.

Comparative Ink C-6

Ink C-6 was prepared the same as Ink 1 except that Dye AA (see below) was used at 0.14 wt. % instead of Dye B.

AA: Magenta dye with CAS No. 224628-70-0, sold as Lightfast Magenta 1 from Eastman Kodak Co. as a 5% solution in water Comparative Ink C-7

Ink C-7 was prepared the same as Ink 1 except that Dye BB (see below) was used at 0.75 wt. % instead of Dye B.

BB: Direct Red 75, sold as Bayscript® Magenta LFB from Bayer Corp. as a 10% solution in water Cyan Ink A cyan ink was prepared using Dye O described above at 3.5 wt. % of the ink composition, glycerol at 25.0 wt. %, triethylene glycol monobutyl ether at 7.0 wt. %, triethanolamine to adjust the pH to 8.0 and the balance water.

Yellow Ink

A yellow ink was prepared using Dye Q described above at 4.0 wt. % of the ink composition, glycerol at 19.0 wt. %, diethylene glycol at 3.0 wt. %, triethylene glycol monobutyl ether at 9.5 wt. %, triethanolamine at 0.9 wt. % and the balance water.

Printing

The above inks were filtered through a 0.2 $\mu$m polytetrafluoroethylene filter, degassed using ultrasonic treatment with an applied vacuum of 559 mm of mercury and placed in a clean empty cartridge used for printing with a Mutoh 4100 ink jet printer. Inks 1–13 of the invention and the comparative Inks C-1–C-7 were each printed in combination with the cyan and yellow inks using a Mutoh 4100 ink jet printer without color correction at 283 dots per centimeter (720 dpi) bi-directional printing, with "microdot on" setting giving a droplet size of about 17 picoliters.

A test image consisting of cyan, magenta, yellow, red, green and blue variable density patches, approximately 7 by 7 mm in size, at 10, 25, 40, 50, 75 and 100% coverage was printed onto Konica QP Photo Quality Ink Jet Paper.

Evaluation Of Test Images—Hue Angle And Chroma Values

For each of the test images, the CIELAB parameters a* and b* were determined for all patches using measurement conditions of D5000 illumination, 2° observer angle, and no filter. Status A green density was also measured for the red, magenta and blue patches. If patches with densities of about 1.0 did not exist, interpolation between patches with higher and lower densities was carried out to determine values of a* and b* at 1.0 Status A green density.

Hue angles for the magenta records were calculated according to Equation 1 above. Values between 336° and 342° are acceptable for ideal magenta hues.

Chroma values for the red, magenta and blue records were calculated according to Equation 2 above. For each of the invention Inks 1–13, the change in chroma values, $\Delta C^*$, relative to the values for comparative Ink C-1 were calculated. An increase in red chroma values for the invention inks relative to Ink C-1 is desirable (positive ΔC* values). For the magenta and blue records, ΔC* values greater than about −2.5 are acceptable. The results are tabulated in Table 1. The data for C-2 through C-5 (single dyes only) are also given in the Table for comparative purposes.

Evaluation Of Test Images—Lightfastness

Each of the test images were laminated with Kodak Professional Pro Luster Larninate and subjected to light fade under 50 kLux high-intensity daylight irradiation and 50% relative humidity for one week. The red, magenta and blue Status A densities were measured before and after treatment, and the percent dye loss was calculated for those patches with an initial Status A green density of 1.0. Numbers less than 15% are desirable. The results are tabulated in 1.

TABLE 1

| Ink | | Hue Angle, h° (°) | Chroma, C* | ΔC* | Light Fade (% Dye Loss) |
|---|---|---|---|---|---|
| C-1 | Red | 339.3 | 77.2 | | 4 |
| | magenta | | 71.5 | | |
| | blue | | 60.5 | | |
| C-2 | Red | 345.7 | 79.6 | | 10 |
| | magenta | | 62.7 | | |
| | blue | | 53.2 | | |
| C-3 | red | 357.4 | 74.0 | | 5 |
| | magenta | | 65.3 | | |
| | blue | | 44.5 | | |
| C-4 | red | 339.0 | 80.0 | | 23 |
| | magenta | | 70.6 | | |
| | blue | | 58.9 | | |
| C-5 | red | 347.6 | 81.0 | | 36 |
| | magenta | | 70.3 | | |
| | blue | | 56.7 | | |
| C-6 | red | 344.0 | 76.7 | −0.5 | 11 |
| | magenta | | 66.6 | −4.9 | |
| | blue | | 46.9 | −13.6 | |
| C-7 | red | 341.9 | 79.7 | +2.5 | 15 |
| | magenta | | 66.8 | −4.7 | |
| | blue | | 55.4 | −5.1 | |
| 1 | red | 341.0 | 89.6 | +12.4 | 8 |
| | magenta | | 69.3 | −2.2 | |
| | blue | | 60.1 | −0.4 | |
| 2 | red | 340.5 | 83.5 | +6.3 | 4 |
| | magenta | | 70.7 | −0.8 | |
| | blue | | 59.3 | −1.2 | |
| 3 | red | 338.9 | 78.0 | +0.8 | 13 |
| | magenta | | 72.5 | +1.0 | |
| | blue | | 60.7 | +0.2 | |
| 4 | red | 341.6 | 79.6 | +2.4 | 8 |
| | magenta | | 70.7 | −0.8 | |
| | blue | | 59.1 | −1.4 | |
| 5 | red | 341.2 | 82.5 | +5.3 | 9 |
| | magenta | | 69.4 | −2.4 | |
| | blue | | 58.7 | −1.8 | |
| 6 | red | 339.5 | 83.7 | +6.5 | 8 |
| | magenta | | 71.1 | −0.4 | |
| | blue | | 60.0 | −0.5 | |
| 7 | red | 340.8 | 81.9 | +4.7 | 12 |
| | magenta | | 71.6 | +0.1 | |
| | blue | | 60.8 | +0.3 | |
| 8 | red | 337.9 | 81.0 | +3.8 | 6 |
| | magenta | | 73.9 | +2.4 | |
| | blue | | 61.3 | +0.8 | |
| 9 | red | 340.7 | 82.1 | +4.9 | 10 |
| | magenta | | 70.9 | −0.6 | |
| | blue | | 59.4 | −1.1 | |
| 10 | red | 338.9 | 88.5 | +11.3 | 6 |
| | magenta | | 70.7 | −0.8 | |
| | blue | | 61.2 | +0.7 | |
| 11 | red | 338.8 | 85.7 | +8.5 | 4 |
| | magenta | | 74.5 | +3.0 | |
| | blue | | 61.9 | +1.4 | |
| 12 | red | 340.6 | 88.2 | +11.0 | 14 |
| | magenta | | 70.1 | −1.4 | |
| | blue | | 60.2 | −0.3 | |

TABLE 1-continued

| Ink | | Hue Angle, h° (°) | Chroma, C* | ΔC* | Light Fade (% Dye Loss) |
|---|---|---|---|---|---|
| 13 | red | 339.4 | 85.0 | +4.8 | 8 |
| | magenta | | 71.5 | 0.0 | |
| | blue | | 60.0 | −0.5 | |

The above results show that the inkjet ink set employed in the invention containing a magenta dye mixture yields reds with higher chroma as compared to ink sets with magenta inks containing only an anthrapyridone dye or other single dyes. The above results also show that the ink jet ink set employed in the invention containing a magenta dye mixture provides desirable magenta hue and acceptable light fastness.

Example 2

Preparation of Ink Jet Recording Element A

An ink jet recording element was prepared as follows:

A coating solution for a base layer was prepared by combining fumed alumina (Cab-O-Sperse® PG003, Cabot Corp.), poly(vinyl alcohol) (Goshsenol® GH-23A, Nippon Gohsei Co., Ltd.) and 2,3-dihydroxy-1,4-dioxane (Clariant Corp.) in a ratio of 88:10:2 to give an aqueous coating formulation of 30% solids by weight.

A coating solution for an image-receiving layer was prepared by combining fumed alumina (Cab-O-Sperse® PG003, Cabot Corp.), poly(vinyl alcohol) (Gohsenol® GH-23A, Nippon Gohsei Co.) and a copolymer of (vinylbenzyl)trimethylammonium chloride and divinylbenzene (87:13 molar ratio) in a ratio of 85:3:12 to give an aqueous coating formulation of 10% solids by weight. The fumed alumina particles have a primary particle size of from about 7 to about 40 nm in diameter and are aggregated up to about 150 nm. Surfactants Zonyl® FSN (E. I. du Pont de Nemours and Co.) and Olin® 10G (Dixie Chemical Co.) were added in small amounts as coating aids.

The above coating solutions were simultaneously bead-coated at 40° C. on polyethylene-coated paper base which had been previously subjected to a corona discharge treatment. The image-receiving layer was coated on top of the base layer. The coating was then dried at 60° C. by forced air to yield a two-layer recording element in which the thicknesses of the bottom and topmost layers were 40 μm (43 g/m$^2$) and 2 μm (2.2 g/m$^2$), respectively.

The ink sets described below were printed onto Ink Jet Recording Element A using the same procedure as described in Example 1. The elements were then tested as in Example 1 with the following results:

TABLE 2

| Ink | | Hue Angle, h° (°) | Chroma, C* | ΔC* |
|---|---|---|---|---|
| C-1 | red | 342.7 | 71.1 | |
| | magenta | | 68.0 | |
| | blue | | 47.2 | |
| C-7 | red | 346.2 | 70.2 | −0.9 |
| | magenta | | 62.4 | −5.6 |
| | blue | | 42.8 | −4.4 |
| 3 | red | 343.3 | 71.3 | +0.2 |
| | magenta | | 68.4 | +0.4 |
| | blue | | 47.4 | +0.2 |
| 5 | red | 344.4 | 75.8 | +4.7 |
| | magenta | | 68.2 | +0.2 |
| | blue | | 48.8 | +1.6 |

The above results show that the inkjet ink set employed in the invention containing a magenta dye mixture yields reds with higher chroma as compared to ink sets with magenta inks containing only an anthrapyridone dye or a mixture of an anthrapyridone dye with another comparative dye. The above results also show that the ink jet ink set employed in the invention containing a magenta dye mixture provides desirable magenta hue.

The invention has been described in detail with particular reference to useful embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with an ink-receiving element comprising a support having thereon an ink-receiving layer;
   C) loading said printer with an ink jet ink set for color printing comprising:
      (a) a yellow ink comprising a carrier and a yellow dye;
      (b) a magenta ink comprising a carrier and a mixture of a water-soluble, magenta anthrapyridone dye and Reactive Red 23, Reactive Red 24, Reactive Red 31, Reactive Red 120, Reactive Red 180, Reactive Red 241, Acid Red 35, Acid Red 52, Acid Red 249, Acid Red 289, Acid Red 388, Direct Red 227 or CAS No. 153204-88-7; and
      (c) a cyan ink comprising a carrier and a cyan dye; and
   D) printing on said ink-receiving layer using said ink jet ink in response to said digital data signals;
   wherein said magenta anthrapyridone dye is a sulfonic acid or sulfonate derivative of a compound represented by the general formula:

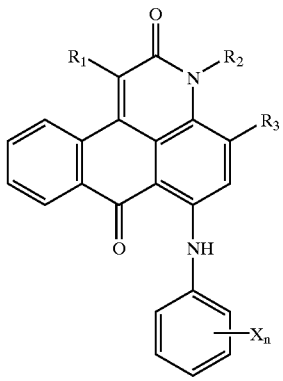

wherein:
$R_1$ represents hydrogen, or a substituted or unsubstituted alkoxycarbonyl, carboxyl, benzoyl, alkyl, aryl, hetaryl, alkoxy or phenoxy group;
$R_2$ represents hydrogen or a substituted or unsubstituted alkyl, alicyclic, aryl or hetaryl group;
$R_3$ represents hydrogen, carboxyl, or a substituted or unsubstituted alkyl, alicyclic, aryl, hetaryl, alkoxy or phenoxy group;
each X independently represents hydrogen, halogen, nitro, hydroxyl, carboxyl, or a substituted or unsubstituted alkyl, alicyclic, aryl, hetaryl, alkoxy, phenoxy, amino, amido or sulfonamido group; and
n represents 0, 1, 2 or 3; said compound not containing a quatemary ammonium or phosphonium counter ion.

2. The method of claim 1 wherein $R_1$ is benzoyl, $R_2$ is hydrogen, $R_3$ is a sulfonated phenoxy group, n is 1 and X is a sulfonate group.

3. The method of claim 1 wherein said magenta ink comprises a mixture of a water-soluble, magenta anthrapyridone dye and Reactive Red 31.

4. The method of claim 1 wherein said magenta ink comprises a mixture of a water-soluble, magenta anthrapyridone dye and Reactive Red 120.

5. The method of claim 1 wherein said magenta ink comprises a mixture of a water-soluble, magenta anthrapyridone dye and Reactive Red 24.

6. The method of claim 1 wherein said magenta ink comprises a mixture of a water-soluble, magenta anthrapyridone dye and Acid Red 289.

7. The method of claim 1 wherein said magenta ink comprises a mixture of a water-soluble, magenta anthrapyridone dye and Acid Red 388.

8. The method of claim 1 wherein said magenta ink comprises a mixture of a water-soluble, magenta anthrapyridone dye and Direct Red 227.

9. The method of claim 1 wherein said magenta ink comprises a mixture of a water-soluble, magenta anthrapyridone dye and Acid Red 52.

10. The method of claim 1 wherein said magenta ink comprises a mixture of a water-soluble, magenta anthrapyridone dye and CAS No. 153204-88-7.

11. The method of claim 1 wherein said ink-receiving layer comprises alumina.

12. The method of claim 1 wherein said ink-receiving layer has a surface pH of less than about 7.

13. The method of claim 1 wherein the magenta dye mixture comprises from about 0.2 to about 10% by weight of said ink jet ink composition.

14. The method of claim 1 wherein the magenta dye mixture comprises from about 70 to about 99% by weight of said water-soluble, magenta anthrapyridone dye.

15. The method of claim 1 wherein said yellow dye is an azoaniline dye.

16. The method of claim 14 wherein said azoaniline dye is Direct Yellow 132.

17. The method of claim 1 wherein said cyan dye is a copper phthalocyanine dye.

18. The method of claim 1 wherein said copper phthalocyanine dye is Direct Blue 307 and/or Direct Blue 199.

19. The method of claim 1 which also includes an additional ink of a black colorant.

* * * * *